(12) United States Patent  (10) Patent No.: US 8,649,748 B2
Björkén  (45) Date of Patent: Feb. 11, 2014

(54) METHOD AND APPARATUS FOR DYNAMIC TRANSMITTER TO MULTI-CARRIER POWER AMPLIFIER MAPPING

(75) Inventor: Peter Björkén, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 13/142,509

(22) PCT Filed: Dec. 29, 2008

(86) PCT No.: PCT/SE2008/051563
§ 371 (c)(1),
(2), (4) Date: Jun. 28, 2011

(87) PCT Pub. No.: WO2010/077191
PCT Pub. Date: Jul. 8, 2010

(65) Prior Publication Data
US 2011/0269405 A1    Nov. 3, 2011

(51) Int. Cl.
*H01Q 11/12*    (2006.01)
*H04B 1/04*    (2006.01)

(52) U.S. Cl.
USPC ............. 455/127.3; 455/127.1; 455/127.2

(58) Field of Classification Search
USPC ............ 455/115.1, 124, 125, 127.1, 127.2, 455/127.3, 127.4, 127.5, 129
See application file for complete search history.

(56) References Cited

U.S. PATENT DOCUMENTS

| | | |
|---|---|---|
| 6,477,388 B1 | 11/2002 | Schmutz |
| 6,952,586 B2 | 10/2005 | Kim et al. |
| 2001/0051513 A1* | 12/2001 | Demarco ............... 455/341 |

FOREIGN PATENT DOCUMENTS

JP    2002058059 A    2/2002

OTHER PUBLICATIONS

Dalwadi, G. et al. "Efficient Doherty Feed-forward Linear Power Amplifier for CDMA 2000 Base-Station Applications." IEEE-International Conference on Signal Processing, Communications, and NEtworks, Madras Institute of Technology, Anna University, Chennai India, Jan. 4-6, 2008.

* cited by examiner

*Primary Examiner* — Christian Hannon
(74) *Attorney, Agent, or Firm* — Coats & Bennett, PLLC

(57) ABSTRACT

According to the teachings presented herein, dynamic mapping is used to determine which multi-carrier power amplifiers (MC-PAs) provide the required transmit power for individual ones of the transmitters in a base station. With dynamic mapping, the required transmit power of any one or more of the transmitters can be distributed to more than one MCPA, providing for more efficient 'packing' of required transmit powers into the available transmit powers of the MCPAs, and/or providing for power mapping based on any one or more mapping criterion, As a non-limiting advantage, the dynamic mapping presented herein reduces the number of MCPAs needed to support a given number of transmitters.

20 Claims, 3 Drawing Sheets

METHOD AND APPARATUS FOR DYNAMIC TRANSMITTER TO MULTI-CARRIER POWER AMPLIFIER MAPPING

TECHNICAL FIELD

The present invention generally relates to systems for signal amplification in wireless communication base stations, and particularly relates to dynamic mapping of base station transmitters to Multi-Carrier Power Amplifiers (MCPAs).

BACKGROUND

Multi-carrier Power Amplifier (MCPA) technology is being developed for a variety of wireless communication system types, including systems based on GSM and CDMA standards. For example, ERICSSON AB manufactures an RBS 6000 family of radio base stations, which include one or more shared radio units (RUSs), providing multicarrier amplification for a wide variety of radio technologies (GSM, WCDMA, LTE, etc.). Before the advent of MCPA, base stations used individual power amplifiers for the various carrier signals being transmitted, or at least used different power amplifiers for different carrier frequencies and types. In contrast, multiple carrier signals of different frequencies and, possibly, different modulation formats, can be "summed" together in either the digital or analog domains, to form a composite signal for power amplification by an MCPA. The MCPA correspondingly is configured with a sufficient amplifier bandwidth and an overall power rating to provide power amplification for the composite signal.

This capability allows several base station transmitters, each outputting a distinct carrier signal for power amplification and transmission, to use the same MCPA. The MCPA thus may be understood as a wideband power amplifier having multiple signal inputs that are combined for overall power amplification. Further, the MCPA includes or is associated with gain setting or control circuitry, providing for ongoing power control of the individual input signals. Using this arrangement, a given base station will commonly include a number of baseband units and a number of radio units. Each radio unit includes an MCPA. Correspondingly, each baseband unit includes at least one transmitter, with each such transmitter outputting a carrier signal at or otherwise corresponding to a given carrier frequency, for power amplification by an assigned one of the MCPAs.

The power limit of each MCPA restricts the number of transmitters that can be assigned to it. A typical approach to "dimensioning" a base station's MCPAs sets the number of transmitters assigned to a given MCPA based on the expected power requirements of the carrier signals from those transmitters (which may be evaluated based on worst-case peak power requirements, or based on expected average power requirements). For example, a 60 Watt (W) MCPA cannot support the worst-case power requirements of two transmitters having a maximum power requirement of 45 W each, but it may be able to support them with the assumption that they will not simultaneously require full power amplification. Thus, the two transmitters may be assigned to the MCPA, perhaps with provisions for power-clipping during instances when the actual combined power requirements of the two transmitters exceed the 60 W capabilities of the MCPA.

The transmit power of an MCPA is typically defined by the combination of average power capability (for example 60W) and peak power capability. The peak power can instantaneously be, for example, 6 dB higher than the average power and is used to handle peak-to-average variations of the composite signal. The peak-to-average ratio depends on the number of carriers and the modulations used. As an example, a single carrier with GMSK modulation has 0 dB peak-to-average ratio while the peak-to-average ratio of two 8-PSK carriers is around 6.2 dB.

Of course, clipping cannot be overly aggressive, or transmit signal quality suffers. Thus, dimensioning according to this approach essentially requires the base station designer to dedicate a given MCPA to a given number of base station transmitters, with appropriate matching by the designer of each MCPA's power capacity to the expected power requirements of the transmitters assigned to it.

SUMMARY

According to the teachings presented herein, dynamic mapping is used to determine which Multi-Carrier Power Amplifiers (MCPAs) provide the required transmit power for individual ones of the transmitters in a base station. With dynamic mapping, the transmit power requirements of any one or more of the transmitters can be distributed to more than one MCPA, providing for more efficient "packing" of required transmit powers into the available transmit powers of the MCPAs, and/or providing for power mapping based on any one or more mapping criterion. As a non-limiting advantage, the dynamic mapping presented herein reduces the number of MCPAs needed to support a given number of transmitters.

One embodiment provides a method of dynamically configuring a set of MCPAs, to provide power amplification for a set of base station transmitters. For example, there may be two or more MCPAs and one or more transmitters, although more typically there will be a plurality of transmitters and a plurality of MCPAs. The method includes dynamically determining required transmit powers of the transmitters and available transmit powers of the MCPAs, and dynamically mapping the required transmit powers of the transmitters to the available transmit powers of the MCPAs. The method further includes controlling the MCPAs, to provide the required transmit powers according to the dynamic mapping. In this context, "dynamically" determining the powers (required and available), and "dynamically" mapping required transmit powers to available transmit powers indicates automatic operations, ongoing at the base station, e.g., according to a periodic control loop, or "continuously" as needed.

In at least one such embodiment, dynamic mapping comprises mapping the required transmit power of each transmitter to a selected MCPA, or to two or more selected MCPAs in distributed fashion, as needed, to fit an aggregate required transmit power of the transmitters to an aggregate available transmit power of the MCPAs, according to one or more power mapping criterions. One such mapping criterion "packs" the required transmit powers of the transmitters into as few of MCPAs as possible, to generally reduce the number of MCPAs needed to support the base station's transmitters. Another mapping criterion, which may alternatively to or additionally with the packing criterion, minimizes the number of transmitters that are mapped to more than one MCPA. Conversely, another possible mapping criterion maximizes transmit diversity, by attempting to map each transmitter to at least two MCPAs, where each such MCPA transmits from a different antenna or antenna element. In all cases, "mapping" a given transmitter to one or more MCPAs means determining which MCPAs will be used to provide all or an allocated portion of the required transmit power for the carrier signal(s) output by the given transmitter.

Another embodiment provides a base station that includes a set of base station transmitters and a set of MCPAs to provide power amplification for the transmitters. More particularly, the base station includes a mapping circuit that is configured to dynamically determine required transmit powers of the transmitters and available transmit powers of the MCPAs, and to dynamically map the required transmit powers of the transmitters to the available transmit powers of the MCPAs. Further, the mapping circuit is configured to control the MCPAs to provide the required transmit powers according to the dynamic mapping.

Of course, the present invention is not limited to the above brief summary of features and advantages. Those skilled in the art will appreciate additional features and advantages upon reading the following description and upon viewing the accompanying drawings.

DETAILED DESCRIPTION

Figure 1:
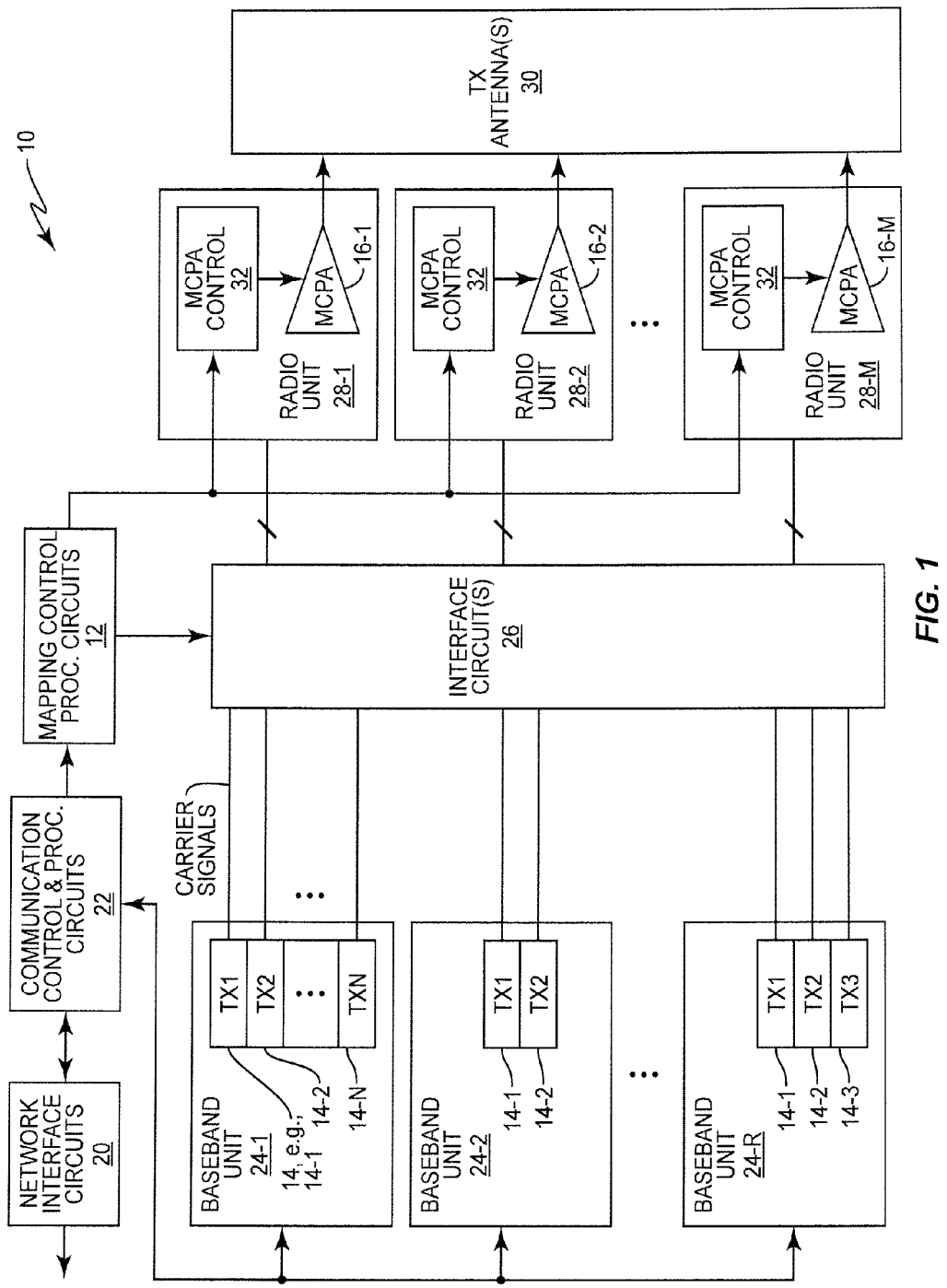
FIG. 1 is a block diagram of one embodiment of a base station that includes a mapping circuit providing dynamic mapping of transmitters to Multi-Carrier Power Amplifiers (MCPAs).

FIG. 1 illustrates a base station 10, including a power mapping control circuit 12, that is configured to dynamically map the required transmit powers of a set of base station transmitters 14 to the available transmit powers of a set of multi-carrier power amplifiers (MCPAs) 16, and to control the MCPAs 16 to provide the required transmit powers according to the dynamic mapping. By way of non-limiting examples, the base station 10 comprises a GSM base station for use in a GSM-based wireless communication network, or it comprises a Wideband CDMA base station for use in a WCDMA-based wireless communication network. Further, it will be understood that the base station 10 generally includes radio receiver circuits for receiving reverse link wireless communication signals from mobile stations being supported by the base station 10, in addition to the illustrated transmit-related circuitry, used for transmitting forward link signals, e.g., carrier signals, to such mobile stations.

Regarding such transmissions by the base station 10, the mapping circuit 12 in one or more embodiments is configured to dynamically determine required transmit powers of the transmitters 14 and available transmit powers of the MCPAs 16, as part of its mapping control. For example, in at least one embodiment, the mapping circuit 12 dynamically determines required transmit powers of the transmitters 14 and available transmit powers of the MCPAs 16, based on automatically tracking changing required and available transmit powers. Required transmit powers change, for example, as a function of changing radio conditions, changing numbers of users, and changing mixes of communication service types. Available transmit powers change, for example as a function of operating conditions, e.g., temperature-based de-ratings from nominal maximum power ratings and, perhaps more significantly, based on the changing dynamic allocations of transmitter power requirements to given ones of the MCPAs 16.

In any case, the mapping circuit 12 is configured to dynamically map the required transmit powers of the transmitters 14 to the available transmit powers of the MCPAs 16. In at least one mapping circuit embodiment, the mapping circuit 12 automatically changes the mapping, as needed, responsive to tracked changes in the required and available transmit powers. Further, in at least one embodiment, the base station 10 is configured to dynamically map the required transmit powers of the transmitters 14 to the available transmit powers of the MCPAs 16 based on determining which transmitters (14) are mapped to which ones of the MCPAs (16) as a function of at least one of service types associated with the transmitter signals, radio environment variables associated with the transmitter signals, and channel modes associated with the transmitter signals. Example service types include, e.g., voice service and data service; example radio environment variables include frequency hopping configurations and mobile speed; and example channel modes include the modulation and coding scheme(s) being used to formulate the transmit data.

As used herein, "mapping" the required transmit power of a given transmitter 14 to the available transmit powers of the MCPAs means determining which one or more of the MCPAs 16 will be used to provide the transmitter's required transmit power. If more than one MCPA 16 will be used to provide the transmitter's required transmit power, such mapping includes the further determination of how the required transmit power will be distributed among the more than one MCPA 16, i.e., mapping in this regard includes determining how the required transmit power will be allocated among the more than one MCPAs 16. For example, if 45 W are required by a given transmitter 14, that required transmit power may be mapped as 45 W to a single MCPA 16, or, as a simple example, mapped in distributed fashion as 20 W to a first MCPA 16, 15 W to a second MCPA 16, and 10 W to a third MCPA 16.

To better understand these mapping and related control operations in the overall base station context, one will note that the base station 10 includes network interface circuits 20, communication control and processing circuits 22, baseband units 24-1, 24-2, etc., interface circuit 26, radio units 28-1, 28-2, etc., and transmit antenna(s) 30. The network interface circuits 20 communicatively couple the base station 10 to other entities within a supporting wireless communication network, such as core network entities, and send/receive call data, timing, and signaling information. The communication control and processing circuits 22 provide call control and signaling for sending and receiving wireless communication signals to and from mobile stations (not shown) being supported by the base station 10.

To that end, and referring to any given one of the baseband units 24-1, 24-2, etc., simply as "baseband unit 24," each baseband unit 24 generates one or more transmit signals (carrier signals) for amplification by one or more of the MCPAs 16. Generally, each transmitter 14-1, 14-2, etc., within a given baseband unit 24 outputs a carrier signal for transmission at a given carrier frequency. Referring to any given transmitter 14-1, 14-2, etc., simply as "transmitter 14," it will be understood that in one or more embodiments each transmitter 14 receives baseband information for carrying out signal modulation according to a given modulation/transmit signal format. Each transmitter 14 therefore may be understood as outputting a carrier signal, in either the digital or analog domains. In at least one embodiment, each transmitter 14 outputs a digital domain carrier signal that is provided to one or more of the MCPAs 16 for conversion to analog domain and power amplification, according to required transmit power.

In this regard, each MCPA 16 in one or more embodiments can receive carrier signals from any one or more of the transmitters 14, and can receive corresponding required power information, or power control information corresponding to such information. With such arrangements, the required transmit power for any given transmitter 14 can be provided by any one or more of the MCPAs 16. Of course, dynamic mapping as taught herein may be practiced even without complete flexibility in mapping transmitters 14 to MCPAs 16, i.e., in embodiments where perhaps not every single transmitter 14 can be arbitrarily mapped to any one of the MCPAs 16.

In any case, it should be understood that the carrier signals from all the transmitters 14 can be coupled to the signal inputs of the MCPAs 16-1, 16-2, etc., through the interface 26 for power amplification. Further, it should be understood that each MCPA 16 can be implemented with a single, wideband power amplifier that uses input combining to create a combined signal for wideband amplification, based on combining the carrier signals input to the MCPA 16. In other embodiments, each MCPA includes a power amplifier for each input signal (for each carrier signal). With this latter arrangement, the input carrier signals are individually power-amplified and then combined after amplification, to create a composite signal for transmission.

Of course, the inventive power mapping taught herein is not dependent on the particular internal implementation details of the MCPAs 16, nor on the particular transmitter-to-MCPA interface implementation. However, in one example embodiment, which has certain implementation advantages, the interconnections between the transmitters 14 and the MCPAs 16 are based on the Common Public Radio Interface (CPRI) standards, as promulgated by an industry consortium that includes ERICSSON AB, HUAWEI, NEC, NORTEL, NOKIA SIEMENS NETWORKS, and ALCATEL-LUCENT. See, for example, the document entitled, Common Public Radio Interface (CPRI); Interface Specification, V4.0 (2008-06-30).

According to CPRI or another digital-domain transmitter-to-MCPA interfacing implementation, all individual (digital) baseband units 24, including their respective transmitters 14, can be connected to all individual radio units 28, including their respective MCPAs 16. In at least one such embodiments, the interface circuit(s) 26 are subsumed into the digital control and signaling connections communicatively linking the transmitters 14 to the MCPAs 16. It should also be noted that the interconnections between transmitters 14 and MCPAs 16 can be implemented using a ring or serial topology and that the interface circuit(s) 26 depicted in FIG. 1 may therefore represent these and other connection topologies.

For CPRI-based implementation, the interface is digitized (layer one options with electrical or optical), and the digital-format carrier signals from each transmitter 14 to the radio units 28 are represented as the In-phase/Quadrature (I/Q) bursts that shall be transmitted, plus information indicating the required transmit power for the burst transmission. For example, a given baseband unit 24 sends the burst information for its transmitters 14 to the radio unit(s) 28, and, if the connections between the baseband units 24 and the radio units 28 are not unique, each baseband unit 24 can include addressing information for the corresponding radio unit 28. In the case that the current power mapping splits the required power for one or more of the transmitters 14 within a given baseband unit 24 between two or more MCPAs 16, that given baseband unit 24 may be configured to send a request to two or more of the radio units 28.

For example, in one embodiment, the mapping circuit 12 dynamically maps the required transmit powers of the transmitters 14 in each baseband unit 24 to the available transmit powers of the MCPAs 16 in the radio units 28, and sends mapping information to the baseband units 24 so that properly addressed "requests" can be sent from the baseband units 24 to the radio units 28. In another embodiment, the baseband units 24 simply send transmit information, e.g., carrier signal data, to one or more of the radio units 28, and the mapping circuit 24 sends power mapping information to the MCPA control circuits 32, to control the amount of available transmit power allocated at each MCPA 16 to any given carrier signal from any given one of the transmitters 14.

Those skilled in the art will therefore appreciate that the mapping circuit 12 as depicted in FIG. 1 may comprise a centralized mapping circuit having interconnection controls with the baseband units 24 and/or the radio units 28. However, particularly in base station embodiments wherein the interface 26 between transmitters 14 and MCPAs 16 is digital, the mapping circuit 12 may remain a centralized function, or may be implemented in distributed fashion. That is the intelligence for determining the mapping between transmitters 14 and MCPAs 16 may reside in distributed fashion in the radio units 28, in the baseband units 24, or partly in both. Further, "mapping" the required transmit powers of the transmitters 14 to the available transmit powers of the MCPAs 16 can comprise, e.g., manipulating signal interconnections and setting amplifier gain in the analog domain, but also may comprise sending logical control information in digital format, such as in sending information about which MCPA 16 should provide amplification for which ones of the transmitter signals and at what powers.

Figure 2:
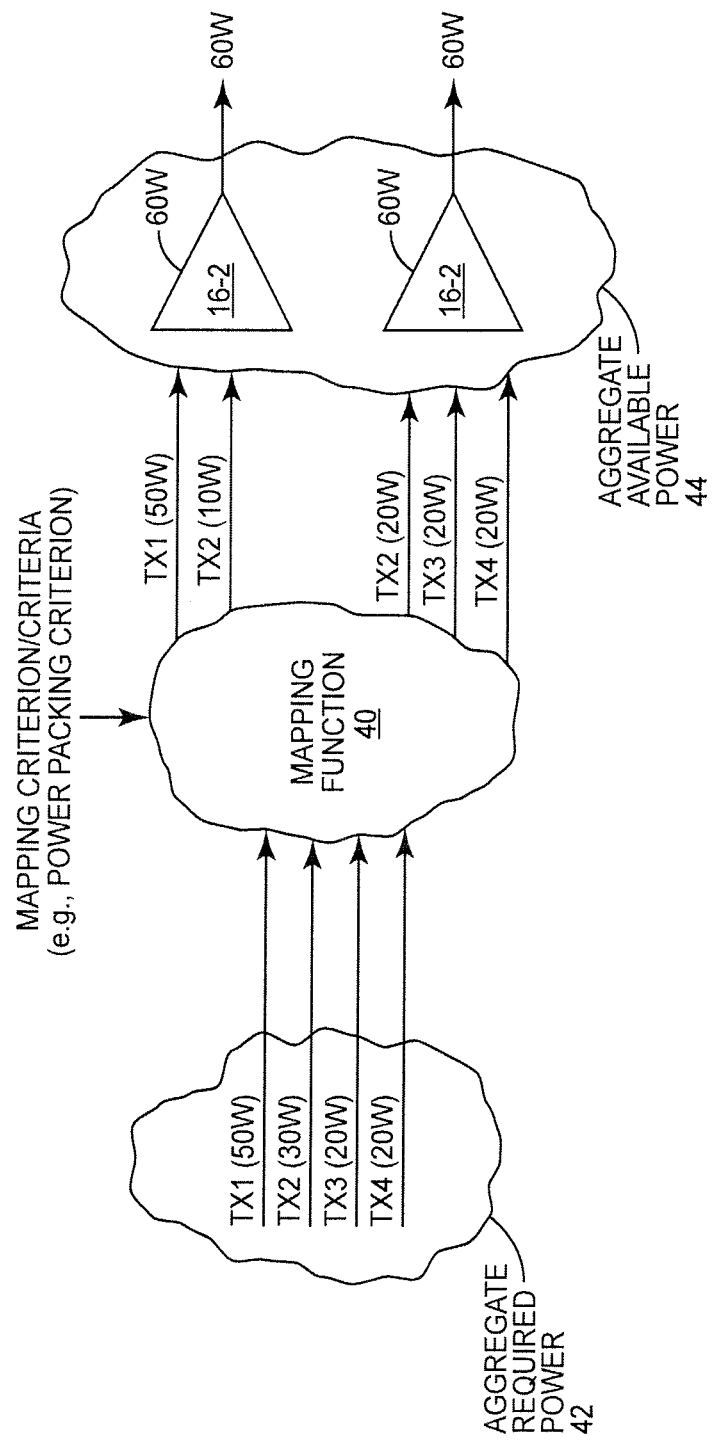
FIG. 2 is a functional diagram of one embodiment of a mapping function, such as may be implemented by the mapping circuit of FIG. 1, for dynamically mapping required transmit powers of base station transmitters to the available transmit powers of available MCPAs.

With these variations in mind, FIG. 2 provides a concrete (but non-limiting) example of the above power mapping. In the illustrated embodiment, a mapping function 40 dynamically maps the aggregate required power 42 of the transmitters 14 (here, 50 Watts for TX1, 30 W for TX2, 20 W for TX3, and 20 W for TX4) to the aggregate available power 44 of the MCPAs 16 (here, 16-1 and 16-2). One sees that the 50 W of TX1 is mapped wholly to MCPA 16-1, which leaves 10 W of available transmit power at MCPA 16-1. This 10 W is less than the required power required for any of the remaining transmitters TX2, TX3, and TX4. Advantageously, however, the mapping circuit 12 makes full use of that 10 W of remaining available power by mapping 10 W of the 30 W required by TX2 to MCPA 16-1. That mapping leaves a remaining 20 W of required transmit power for TX2, which is mapped to MCPA 16-2. With 20 W of the available 60 W at MCPA 16-2 used for TX2, the remaining 40 W of available transmit power at MCPA 16-2 is used to support the required 20 W for TX3 and the required 20 W for TX4.

Therefore, unlike a conventional one-to-one mapping between transmitters and MCPAs, the mapping circuit 12 and associated mapping method presented herein allow for the dynamic mapping of required transmit powers to available transmit powers. With such mapping, the required transmit power for any one or more given ones of the transmitters 14 can be mapped to two or more of the MCPAs 16, as needed, such that those two or more MCPAs 16 each provide a portion of that transmitter's required transmit power. In this regard, one or more embodiment of mapping as taught herein can be understood as allowing for full "packing" of each available MCPA 16, in that the ability to distribute the power requirements for a given transmitter 14 across any number of MCPAs 16 allows all of the available power at each MCPA 16 to be used.

Of course, the particular mapping used may be structured according to one or more mapping strategies, and/or varied as a function of changing signal/environment variables. In one embodiment of the mapping function 40, as implemented by processing operations of the mapping circuit 12, it dynamically maps the required transmit powers of the transmitters 14 to the available transmit powers of the MCPAs 16 by minimizing the number of MCPAs 16 needed to support the aggregate required transmit power 42 of the transmitters 14. This minimization is based on the mapping circuit 12 distributing the required transmit powers of individual transmitters 14 between two or more of the MCPAs 16, as needed, to make the best utilization of the available transmit powers. For example, if one "assigns" the required transmit power of each transmitter 14 to a given MCPA 16 as an all-or-nothing proposition, it is likely that not all of the available transmit power at a given MCPA 16 is utilized. However, with the mapping taught herein, the required transmit power from any one or more of the transmitters 14 can be split among two or more MCPAs 16, where each such MCPA 16 provides an allocated portion of the overall required transmit power for each such transmitter 14.

The particular algorithm used to carry out such mapping can be structured according to a desired goal or goals. Thus, in at least one embodiment, the mapping function 40 is configured to dynamically determine power mappings based on a mapping criterion or mapping criteria. One embodiment maps based on a "power packing" criterion, wherein the mapping function 40 uses as few MCPAs 16 as possible to map the aggregate required transmit power 42 to the aggregate available transmit power 44. "Aggregate" required transmit power is the overall transmit power required by all of the transmitters 14, and "aggregate" available transmit power is the overall available transmit power that can be provided by the MCPAs 16. It should be understood that these aggregate values can be dynamic.

The power packing criterion is advantageous in that it commonly allows base station installations to be dimensioned with fewer MCPAs than would be required to support a given number of transmitters with a conventional one-to-one mapping between MCPAs and transmitters. As part of the "power packing" mapping, or as an alternative to such power packing, the mapping function 40 is configured minimize the number of transmitters 14 whose required transmit powers are mapped to more than one MCPA 16. In simple terms, this optimization or sub-optimization of the mapping function 40 is designed to simplify the interconnect and command requirements associated with the dynamic mapping taught herein, based on minimizing the number of individual transmitters 14 whose required transmit power is split in allocated portions across two or more of the MCPAs 16.

As a further addition or alternative to the above "power packing" mapping, the mapping function 40 of the mapping circuit 12 is configured in one or more embodiments to distribute the required transmit powers of individual transmitters 14 between two or more of the MCPAs 16, as needed, based on maximizing the number of transmitters 14 whose required transmit powers are mapped to more than one MCPA 16. This optimization or sub-optimization is useful, for example, where there is an individual transmit antenna in transmit antenna(s) 30 (or at least a separate transmit antenna element) for each MCPA 16. With per-MCPA transmit antennas, transmit diversity for a given transmitter 14 is achieved by using two or more MCPAs 16 to output the carrier signal for that transmitter 14. Thus, in at least one embodiment where per-MCPA transmit antennas are used, the mapping circuit 12 is configured to provide transmit diversity for as many of the transmitters 14 as possible, based on splitting the required transmit power of each such transmitter 14 between at least two of the MCPAs 16.

In such embodiments, dynamically mapping the required transmit powers of the transmitters 14 to the available transmit powers of the MCPAs comprises maximizing the number of transmitters 14 that have transmit diversity by maximizing the number of transmitters 14 that are mapped to more than one MCPA 16. That is, transmit diversity is maximized by maximizing the number of individual transmitters 14 that have their required transmit power split among two or more MCPAs 16. In other embodiments, such as where mapping simplicity rather than transmit diversity maximization is the mapping criterion, dynamically mapping the required transmit powers of the transmitters 14 to the available transmit powers of the MCPAs 16 comprises minimizing the number of transmitters 14 that are mapped to more than one MCPA 16. In at least one such embodiment, minimizing the number of transmitters 14 that are mapped to more than one MCPA 16 comprises first mapping those transmitters 14 having the highest required transmit powers to single MCPAs 16, and, as needed, mapping one or more of the remaining transmitters 14 to more than one MCPA 16. An example algorithm for carrying out such processing can be expressed as: (1) at a given operating time or for a given operating interval, determined the required transmit powers of the transmitters 14; (2) rank the transmit powers highest to lowest; (3) determine the available transmit powers for the MCPAs 16; (4) assign the first n highest required powers to individual MCPAs 16 (where "n"=1, 2, or another integer number); and (5) assign the remaining transmit power requirements to one or more of the MCPAs 16 in view of their remaining power availabilities, using splitting as needed.

Broadly, those skilled in the art will recognize that the mapping function 40 implemented by the mapping circuit 12 can be configured according to a desired mapping criterion or criteria. Doing so causes the mapping operations to conform to a given goal, whether that be maximization of transmit diversity, optimal packing of the aggregate required transmit power 42 into as few MCPAs 16 as possible, etc. Dynamic mapping as taught herein comprises mapping the required transmit power of each transmitter 14 to a selected MCPA 16, or to two or more selected MCPAs 16 in distributed fashion, as needed, to fit the aggregate required transmit power 42 of the transmitters 16 to the aggregate available transmit power 44 of the MCPAs 16, according to one or more power mapping criterions.

Figure 3:
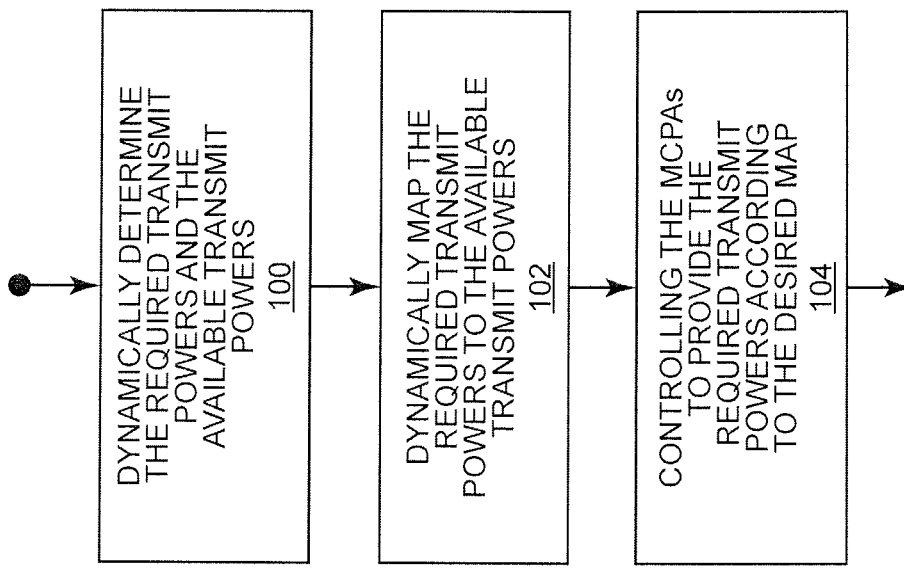
FIG. 3 is a logic flow diagram of one embodiment of a method for mapping required transmit powers of base station transmitters to the available transmit powers of available MCPAs.

The base station 10 is configured, e.g., by inclusion of the mapping circuit 12, to implement a method of dynamically configuring a set of MCPAs 16 to provide power amplification for a set of base station transmitters 14. One embodiment of this method is illustrated in FIG. 3, wherein the method includes dynamically determining required transmit powers of the transmitters 14 and available transmit powers of the MCPAs 16 (Block 102), and dynamically mapping the required transmit powers of the transmitters 14 to the available transmit powers of the MCPAs 16 (Block 104). (It may be that the "available" transmit powers of the MCPAs 16 are known at least in terms of upper limits, such that dynamically determining the available transmit powers primarily concerns tracking the power allocations made to individual ones of the MCPAs 16, as a basis for knowing how much transmit power remains available at any given MCPA 16 during the dynamic mapping process.)

The method further includes controlling the MCPAs 16 to provide the required transmit powers according to the dynamic mapping (Block 106). For example, the mapping circuit 12 determines the commands needed to specify which MCPAs 16 are used to provide all or a portion of the required transmit power of each given transmitter 14, and sends those commands to MCPA controllers 32, or sends the information to the baseband units 24, to cause them to make the appropriate power requests to the radio units 28.

Thus, controlling the MCPAs 16 to provide the required transmit powers according to the dynamic mapping comprises, in at least one embodiment, indicating the dynamic mapping to the MCPAs 16, directly or indirectly, via digital signaling from the mapping circuit 12. In particular, the mapping circuit 12 in one or more embodiments generates digital command words that indicate which MCPAs 16 are to provide all or a portion of the required transmit power of each transmitter 14. These command words are sent directly from the mapping circuit 12, such as over a digital communication bus, to the radio units 28, or are sent to the baseband units 24, which in turn send corresponding power assignment/allocation requests to the radio units 28.

In any case, referring to any given MCPA simply as "MCPA 16," those skilled in the art will appreciate that any given MCPA 16 provides a finite amount of transmit power. In one sense, the available transmit power of a given MCPA 16 is "static" in that any given MCPA 16 generally is built or otherwise configured to provide a total amount of transmit power, although that upper limit may vary as function of temperature or other operating conditions. For example, a given MCPA 16 may be designed to provide a maximum of 60 Watts (W) of power amplification, at least under nominal operating conditions. However, how the required transmit powers of one or more of the transmitters 14 are "mapped" (assigned or allocated) to that available power is dynamically determined according to the teachings presented herein, such as by the mapping circuit 12 communicating power mapping information to MCPA control circuits 32 within the radio units 28-1, 28-2, etc.

Regardless of how the mapping is commanded, in at least one embodiment of the above method, dynamically determining required transmit powers of the transmitters 14 and available transmit powers of the MCPAs 16 comprises automatically tracking changing required and available transmit powers. Correspondingly, dynamically mapping the required transmit powers of the transmitters 14 to the available transmit powers of the MCPAs 16 comprises automatically changing the mapping, as needed, responsive to tracked changes in the required and available transmit powers. Tracking is done periodically, or continuously (in the processing sense), such that the distribution of the transmitters' required transmit powers to the MCPAs' available transmit powers changes, as needed, during live operation of the base station 10.

It should be noted that the base station 10 in one or more embodiments includes one or more computer systems that are configured to carry out the desired base station operations based on the execution of stored computer program instructions. For example, the communication control and processing circuits may comprise one or more microprocessor-based circuit cards, each having access to non-volatile memory (FLASH, EEPROM, etc.), or to another computer readable medium (e.g., hard drive), storing computer program instructions organized as one or more computer programs.

In particular, the mapping circuit 12 may be implemented in hardware, software, or any combination thereof. In one embodiment, the mapping circuit 12 is implemented in one or more microprocessors, based on the execution of stored computer program instructions, which configure the one or more microprocessors to carry out the algorithm of FIG. 3, according to any one or more defined mapping criterion. Of course, the mapping circuit 12 also may be implemented using dedicated hardware implemented in programmed logic, such as implementation via one or more Field Programmable Gate Arrays (FPGAs), Complex Programmable Logic Devices (CPLDs), Application Specific Integrated Circuits (ASICs), with or without microprocessor-based execution cores, or via some other digital circuitry.

With these example implementation details in mind, those skilled in the art will appreciate that the present invention is not limited by the foregoing description, nor is it limited by the accompanying drawings. Instead, the present invention is limited by the following appended claims, and by their legal equivalents.

What is claimed is:

1. A method of dynamically configuring a set of multi-carrier power amplifiers, MCPAs, to provide power amplification for a set of base station transmitters, said method comprising:
   dynamically determining required transmit powers of the transmitters and available transmit powers of the MCPAs;
   dynamically mapping the required transmit powers of the transmitters to the available transmit powers of the MCPAs, by mapping the required transmit power of a first transmitter to the available transmit power of a first MCPA, and mapping the required transmit power of a second transmitter to the available transmit power of a second MCPA, without also mapping the required transmit power of the second transmitter to the available transmit power of the first MCPA, wherein the first MCPA is different from the second MCPA and the first transmitter is different than the second transmitter, wherein dynamically mapping the required transmit powers of the transmitters to the available transmit powers of the MCPAs comprises minimizing the number of MCPAs needed to support an aggregate required transmit power of the transmitters, based on distributing the required transmit powers of individual transmitters between two or more of the MCPAs, as needed; and
   controlling the MCPAs to provide the required transmit powers according to the dynamic mapping.

2. The method of claim 1, wherein dynamically determining required transmit powers of the transmitters and available transmit powers of the MCPAs comprises automatically tracking changing required and available transmit powers, and wherein dynamically mapping the required transmit powers of the transmitters to the available transmit powers of the MCPAs comprises automatically changing the mapping, as needed, responsive to tracked changes in the required and available transmit powers.

3. The method of claim 1, wherein controlling the MCPAs to provide the required transmit powers according to the dynamic mapping comprises indicating the dynamic mapping to the MCPAs directly or indirectly, via digital signaling from a mapping circuit.

4. The method of claim 1, wherein distributing the required transmit powers of individual transmitters between two or more of the MCPAs, as needed, comprises minimizing the number of transmitters whose required transmit powers are mapped to more than one MCPA.

5. The method of claim 1, wherein distributing the required transmit powers of individual transmitters between two or more of the MCPAs, as needed, comprises maximizing the number of transmitters whose required transmit powers are mapped to more than one MCPA.

6. The method of claim 1, wherein dynamically mapping the required transmit powers of the transmitters to the available transmit powers of the MCPAs comprises determining which transmitters are mapped to which ones of the MCPAs as a function of at least one of service types associated with the transmitter signals, radio environment variables associated with the transmitter signals, and channel modes associated with the transmitter signals.

7. The method of claim 1, wherein dynamically mapping the required transmit powers of the transmitters to the available transmit powers of the MCPAs comprises minimizing the number of transmitters that are each mapped to more than one MCPA.

8. The method of claim 7, wherein minimizing the number of transmitters that are each mapped to more than one MCPA comprises mapping transmitters having highest required transmit powers to single MCPAs, and, as needed, mapping each of one or more of the remaining transmitters to more than one MCPA.

9. The method of claim 1, wherein each MCPA is connected to a different transmit antenna, and wherein dynamically mapping the required transmit powers of the transmitters to the available transmit powers of the MCPAs comprises maximizing the number of transmitters that have transmit diversity by maximizing the number of transmitters that are mapped to more than one MCPA.

10. The method of claim 1, wherein dynamically mapping the required transmit powers of the transmitters to the available transmit powers of the MCPAs comprises mapping the required transmit power of each transmitter to a selected MCPA, or two or more selected MCPAs in distributed fashion, as needed, to fit an aggregate required transmit power of the transmitters to an aggregate available transmit power of the MCPAs according to one or more power mapping criterions.

11. A base station that includes a set of base station transmitters, and a set of multi-carrier power amplifiers, MCPAs, to provide power amplification for the transmitters, and that comprises a mapping circuit configured to:
dynamically determine required transmit powers of the transmitters and available transmit powers of the MCPAs;
dynamically map the required transmit powers of the transmitters to the available transmit powers of the MCPAs, by mapping the required transmit power of a first transmitter to the available transmit power of a first MCPA, and mapping the required transmit power of a second transmitter to the available transmit power of a second MCPA, without also mapping the required transmit power of the second transmitter to the available transmit power of the first MCPA, and by minimizing the number of MCPAs needed to support an aggregate required transmit power of the transmitters, based on distributing the required transmit powers of individual transmitters between two or more of the MCPAs, as needed; and
control the MCPAs to provide the required transmit powers according to the dynamic mapping.

12. The base station of claim 11, wherein the mapping circuit is configured to dynamically determine the required transmit powers of the transmitters and the available transmit powers of the MCPAs by automatically tracking changing required and available transmit powers, and wherein the mapping circuit is configured to dynamically map the required transmit powers of the transmitters to the available transmit powers of the MCPAs by automatically changing the mapping, as needed, responsive to tracked changes in the required and available transmit powers.

13. The base station of claim 11, wherein the mapping circuit is configured to control the MCPAs to provide the required transmit powers according to the dynamic mapping by indicating the dynamic mapping to the MCPAs via digital signaling.

14. The base station of claim 11, wherein distributing the required transmit powers of individual transmitters between two or more of the MCPAs, as needed, comprises minimizing the number of transmitters whose required transmit powers are mapped to more than one MCPA.

15. The base station of claim 11, wherein distributing the required transmit powers of individual transmitters between two or more of the MCPAs, as needed, comprises maximizing the number of transmitters whose required transmit powers are mapped to more than one MCPA.

16. The base station of claim 11, wherein the mapping circuit is configured to dynamically map the required transmit powers of the transmitters to the available transmit powers of the MCPAs by minimizing the number of transmitters that are each mapped to more than one MCPA.

17. The base station of claim 16, wherein minimizing the number of transmitters that are mapped to more than one MCPA comprises mapping transmitters having highest required transmit powers to single MCPAs, and, as needed, mapping each of one or more of the remaining transmitters to more than one MCPA.

18. The base station of claim 11, wherein the mapping circuit is configured to dynamically map the required transmit powers of the transmitters to the available transmit powers of the MCPAs by determining which transmitters are mapped to which ones of the MCPAs as a function of at least one of service types associated with the transmitter signals, radio environment variables associated with the transmitter signals, and channel modes associated with the transmitter signals.

19. The base station of claim 11, wherein each MCPA is connected to a different transmit antenna, and wherein the mapping circuit is configured to dynamically map the required transmit powers of the transmitters to the available transmit powers of the MCPAs by maximizing the number of transmitters that have transmit diversity, and to maximize the number of transmitters that have transmit diversity by maximizing the number of transmitters that are mapped to more than one MCPA.

20. The base station of claim 11, wherein the mapping circuit is configured to dynamically map the required transmit powers of the transmitters to the available transmit powers of the MCPAs by mapping the required transmit power of each transmitter to a selected MCPA, or two or more selected MCPAs in distributed fashion, as needed, to fit an aggregate required transmit power of the transmitters to an aggregate available transmit power of the MCPAs according to one or more power mapping criterions.

* * * * *